CLOSED LOOP SERVO SYSTEM WITH DUAL CHANNEL DEGENERATIVE FEEDBACK

Filed July 9, 1962 2 Sheets-Sheet 1

INVENTOR.
RICHARD A. WALLACE
BY
S. C. Yeaton
ATTORNEY

INVENTOR.
RICHARD A. WALLACE
BY
S. C. Yeaton
ATTORNEY

United States Patent Office 3,184,662
Patented May 18, 1965

3,184,662
CLOSED LOOP SERVO SYSTEM WITH DUAL CHANNEL DEGENERATING FEEDBACK

Richard A. Wallace, Phoenix, Ariz., assignor to Sperry Rand Corporation, Great Neck, N.Y., a corporation of Delaware Filed July 9, 1962, Ser. No. 208,389
8 Claims. (Cl. 318—18)

Figure 1:
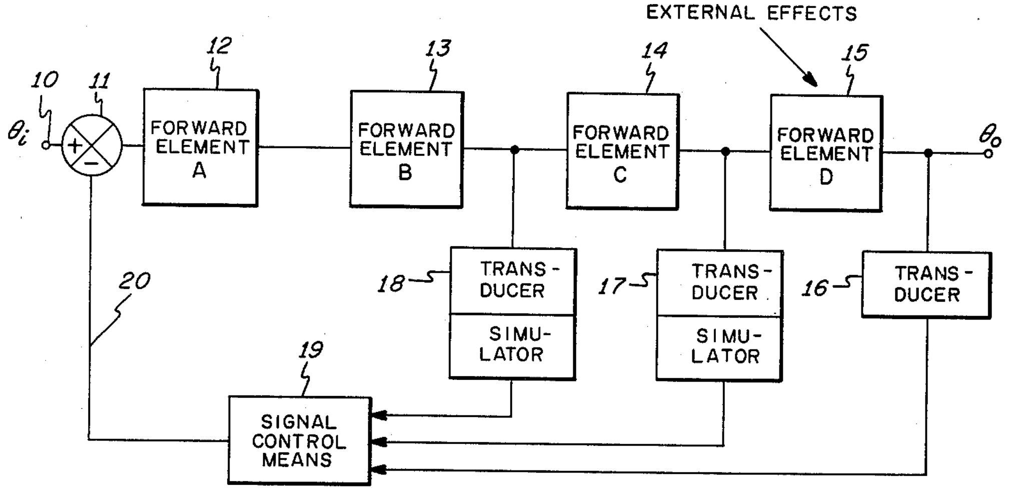

This invention relates to closed loop servo systems of the dual feedback channel type and more particularly it concerns a means for avoiding resonance and loss problems usually associated with such systems.

In such servo systems, an object is driven toward a desired condition in response to an applied error signal. The error signal is derived by differencing a reference signal representing a desired output condition, and a feedback signal representing the actual output condition. A high accuracy servo system is one wherein the difference between the actual and desired output conditions is maintained at a minimum value. In order to operate with high accuracy, therefore, the system must have a very high gain characteristic so as to respond to the small resulting error signals.

The extent to which the gain of the system may be increased is limited by the fact that certain of its elements are frequency sensitive energy storage devices. These devices amplify and shift the phase of various signal frequency components passing through them; and while their effect on certain components may be negligibly small, the effect on others may be so great as to produce a feedback signal of sufficient phase and amplitude to drive the system into an uncontrolled state of oscillation. The problem becomes especially serious where the servo system is used to position large mechanical objects such as radar antennas and gun mounts. These elements have natural resonant frequencies close enough to the range of component frequencies in the reference signals that many of these components will be unduly amplified and phase shifted in passing through the system, thus causing oscillation. Should system gain be reduced to prevent oscillation, accuracy will be sacrified; and should the system be made insensitive to the frequency components which are adversely affected, system response will be degraded.

A common prior art technique for overcoming the gain and frequency bandwidth limitations of devices servo systems containing resonant elements has been to provide complementing network in the respective feedback channels of the system. Such a feedback arrangement causes a compensating attenuation and phase shift of those frequency components which are adversely affected by the troublesome elements. This permits a relatively wide band of signal frequency components to be utilized by the system without necessity for unduly reducing overall gain. The compensating filter network technique, however, is subject to a number of limitations especially when applied to the antenna or gun mount type control systems previously mentioned. Because of the complexity of such objects, their frequency characteristics are generally very difficult to ascertain and once ascertained would require an extremely intricate and expensive compensating network. Even more important, however, is the fact that unpredictable external influences such as wind loading, accelerations (e.g., vehicle roll), wear, corrosion and temperature variation on such object or element will cause unpredictable changes in the gain-phase shift vs. frequency characteristics of such a system. A dual feedback system with complementing networks such as described could not possibly account for these variations.

A second prior art technique for overcoming the resonance effect problem in dual feedback type servo systems is that of bypassing the troublesome object or element; as by obtaining feedback information from the input to the object or element rather than from its output. While this approach may overcome the resonance problem, it does so at the expense of accuracy. Most control system components, and especially the large driven objects mentioned previously, are characterized by a certain amount of play or back-lash. They may also have a certain degree of internal slippage and possibly are subject to deformation under load. The external influences mentioned will then cause unpredictable variations between the input to and the output from these elements in the system which cannot be corrected without a feedback signal supplied from the output side of the element.

Consequently, it is an object of this invention to improve the performance of servo systems of the dual feedback type having complementing filter networks.

Another object of the invention is to stabilize the operation of a servo system of the dual feedback type by including therein respective crossover frequency filter networks.

A further object is to provide such a stabilization means with simple and inexpensive components.

A still further object is to maintain such stabilization regardless of the erratic effects of external influences.

In the present invention these objects are accomplished through the overlapping of the frequency ranges of the respective filters in the feedback channels. A first feedback channel derives information from the actual output condition of a troublesome element, while a second derives information from inputs to the element. In the improved system, the frequency range of the high-pass filter included in the first feedback channel overlaps with the range of the low-pass filter included in the second feedback channel.

Figure 2:
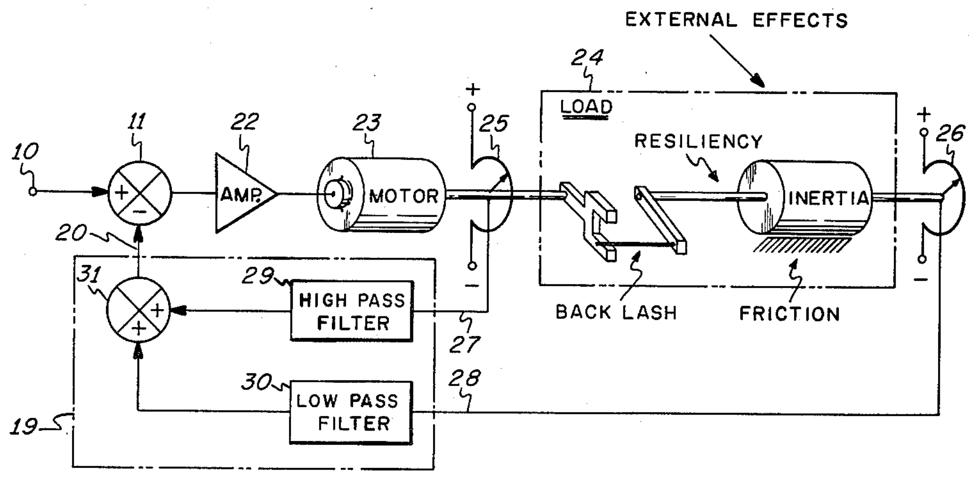
Figure 3:
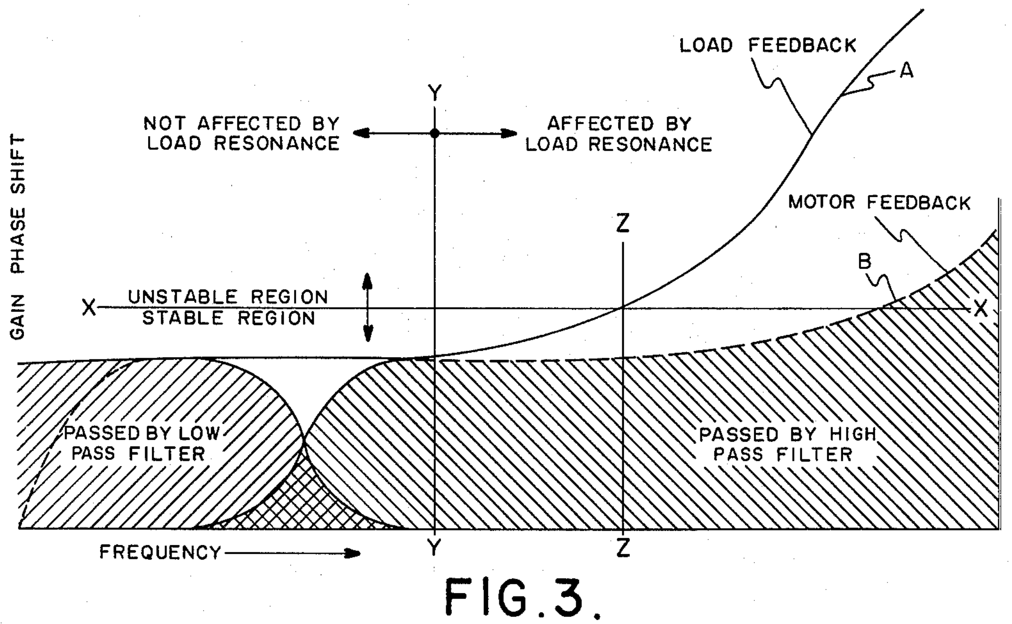
Figure 4:
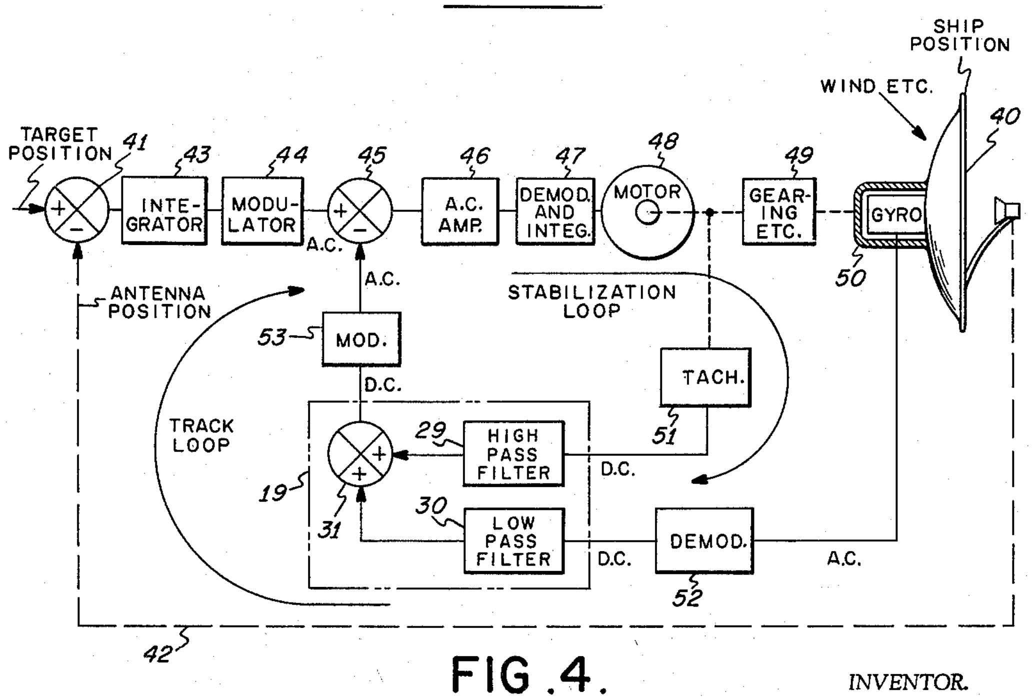

Referring now to the figures:

FIG. 1 is a block diagram illustrating a general application of the present invention, FIG. 2 is a schematic drawing illustrating one embodiment of the present invention, FIG. 3 is a graph useful in understanding the operation of the embodiment of FIG. 2, and FIG. 4 is a block diagram illustrating a preferred embodiment of the invention.

In the feedback servo system of FIG. 1, the magnitude of an output condition, designated as $\theta_o$, is controlled according to a reference input signal $\theta_i$. The system includes a terminal 10 for receiving an input signal and an error detector 11 for developing a control or error signal in response thereto. A series of forward elements 12, 13, 14 and 15 are provided for amplifying and transforming the error signal to change the output condition accordingly. The feedback signal provided subtracts from the reference input signal at the error detector to produce the error or control signal. When the output conditions attains its desired value, the feedback signal equals the reference signal in magnitude. At this point the two signals cancel in the error detector and actuation of the output condition ceases.

The feedback channels include a plurality of transducer-simulator elements 16 to 18 connected to various points among the forward series of components and supplying information from these points to a signal control means 19 connected by lead 20 to detector 11.

Most servo systems are used to regulate a physical condition such as mechanical position, temperature, pressure or a time derivative of some physical condition. Consequently, the forward elements must perform the functions of error signal amplification, conversion to mechanical or similar force and application of this force to change the output condition. At the same time the feedback channels must produce a signal representative of this actual output condition. Most elements which perform these functions have certain inherent energy storage characteristics which cause change in signal amplitude and phase at various signal frequencies. However, it is generally only those forward elements closest to the actual output whose frequency is sufficiently high to result in resonance. It is the purpose of the low-pass filter included in the related feedback channel to attenuate signals in this frequency range.

In the proposed servo system, the outer transducer 16 develops a signal precisely in accordance with the actual output condition and supplies this to the signal control means 19. The next transducer simulator means 17 develops a signal in accordance with the condition at the output of the forward element 14 and then processes this signal in a manner to simulate the effects of the forward element 15 were it not frequency sensitive. This simulated signal is also supplied to the signal control means 19. In like manner, the third transducer simulator 18 also generates a signal in accordance with the condition of the output forward element 13 and processes this signal to simulate the effects of the bypassed forward element 14 and 15. This simulated signal is also supplied to the input of the signal control means 19. The feedback channels of the improved servo system combine two or more of the supplied signals in overlapping frequency ranges to provide a single degenerative input to the detector 11.

The improved servo system operates in the following manner. A change in the input signal $\theta_i$ is produced at the input terminal 10 by an external means (not shown). The reference signal in undergoing this change can be considered according to Fourier theory as comprising the sum of a number of different frequency components of various amplitudes. The degree of precision or response to the system to signal $\theta_i$ depends upon the number of these components which pass through it without being unduly amplified, attenuated or shifted in phase. Although certain frequency components are generally attenuated to a certain degree in the forward elements, it is the resonant properties of those elements near the output of the system that cause frequency components within a certain range to be greatly amplified and phase shifted which most seriously affects proper operation.

The improved servo system operates in a frequency range that is not affected by load resonance. This is done by synthesizing a feedback signal with frequency components selected at different points along the forward series of elements. While each of the transducer-simulator means produce all the frequency components of a feedback signal, the signal control means 19 attenuates resonant frequency components and utilizes only those frequency components which are not unduly affected by the forward elements near the system output. In this manner, a feedback signal having all of the frequency components of the reference input signal is maintained, thus insuring high accuracy and good response. At the same time the system gain may be set at high value for frequency components not affected by resonance effects without inducing instability from overamplification or phase shift of those frequency components which are so affected.

Referring now to FIG. 2, a further embodiment, more particularly directed toward a mechanical load positioning apparatus, may be seen. As in FIG. 1 the present embodiment includes an input terminal 10 receiving input command or reference signals. This terminal is connected to the positive input of an error detector 11 whose output in turn is supplied to a series of forward elements. The forward elements include an amplifier 22 for amplifying the error signal, a motor 23 for producing mechanical motion in accordance with the amplifier signal and a mechanical load 24 driven by the motor shaft. The load characteristics are shown schematically to include backlash or play, resiliency, inertia and friction. Although these characteristics are shown in "lumped constant" arrangement, in actual practice they would be distributed throughout the load in a more or less uneven manner resulting in an overall signal amplification and/or phase shift characteristic which varies in an extremely complex manner with frequency, especially in the higher range of frequencies. Also, this complex characteristic itself changes in an unpredictable manner in the higher frequency range when external influences such as wind, accelerations, wear, corrosion and temperature act upon the load.

As in the embodiment of FIG. 1, a plurality of transducer-simulator elements are provided at various points in the forward series of elements. More specifically, a pair of potentiometers 25 and 26 are provided respectively to produce feedback signals in accordance with conditions at these points at the motor shaft and at the load input. In the present embodiment, the load signal transfer characteristics, save for undue and uneven amplitude and phase variation, produce no signal modification for which simulation is necessary beyond that intrinsically provided by the potentiometer 25 alone. Therefore, the potentiometer 25 can be considered in the present embodiment as having the characteristics of both the transducer and simulator of its corresponding element in FIG. 1.

The potentiometer outputs are supplied to the signal combining and control means 19 which additively combines a different range of frequency components from each of the feedback signals produced at either side of the load. The signal control means 19 includes a high pass filter 29 connected to the load input potentiometer 25, a low pass filter 30 connected to the load output potentiometer 26, and an additive device or combining means 31. The filters 29 and 30 are chosen so that their respective frequency ranges overlap at a non-resonant frequency point to the left or below the critical frequency line Y—Y in FIG. 3. Signal frequency components in the feedback line to the right of the line Y—Y affected by load resonance are attenuated by the low-pass filter 30 in the line to the potentiometer 26. Signal frequency components to the left of the line Y—Y that do not affect load resonance are attenuated by the high pass filter 29. Since the filters do not have abrupt but rather have gradual attenuation characteristics at the boundaries of this frequency range, it is important that their frequency attenuation characteristics in the cross-over frequency region supplement one another in order to prevent complete attenuation or complete passage of the same frequency component from each feedback transducer. The signal combining means 31 operates to add the transmitted frequency components from the two filters so as to provide a combined feedback signal having a frequency spectrum whose upper frequency limit is indicated at the frequency of the line Y—Y in FIG. 3. This signal is then supplied via a feedback line 20 in degenerative manner to the error detector 11.

FIG. 3 is a graph that plots the gain and phase shift of the overall system with respect to the frequency of the feedback signals. The gain and phase shift are measured at the feedback line 20 of the embodiment of FIG. 2 when this line is disconnected from the error detector 11. According to the Nyquist stability criterion, signals at the line 20 should never be greater in amplitude nor more than 180° lagging behind the reference signals applied at the input terminal 10 if the system is to operate in a stable manner. The ordinate axis of the diagram of FIG. 3 represents a combination of the gain and phase shift as measured on the feedback line 20, and the level of this characteristic as defined by line X—X in the diagram refers to that value of this characteristic above which the gain and phase shift are such as to produce an unstable condition.

A solid line A, and a dashed line B in the diagram represent the overall system characteristic at the line 20 for all frequency components of feedback signals taken directly from the potentiometer 26 and directly from the potentiometer 25 respectively. It can be seen that with a feedback which bypasses the load, as shown in the dashed line B, operation of the system can be extended to a much higher range of frequencies and yet remain within the limits of stability. However, such a feedback technique, as stated previously, would result in a degradation of accuracy since the combination of external influences and possible bending, slippage or backlash within the load will produce a difference between load input and output positions. The present invention overcomes this accuracy problem and at the same time allows a greater range of frequencies to be utilized without exceeding the stability limit. In the improved system, the low frequency components from the load output and with high frequency components from the load input are combined in an overlapping frequency range to provide a degenerative feedback input.

The frequency components passed by both of the filters are represented by the cross hatched areas in the diagram that are included in the overlapping frequency range. As previously stated, in order to provide a smooth transition without undue amplification or omission of any frequency components in the crossover region, the filter characteristics must be designed so as to supplement one another. Although certain frequency components in both channels will be passed in part by both filters, the percentage of any component passed by one filter should always be equal to the supplementing percentage of the component passed in the other filter. In the range of frequencies within which the system operates, the crossover region is between the provided upper and lower frequency limits. This region passes the signal of both of the transducers. The system further includes a region between the lower limit and the crossover region for passing the signal of the first transducer. The further region provided between the upper range limit and the crossover region passes the signal of the second transducer. The means 31, filter 29, and filter 30 in the respective dual feedback channels provides a frequency selective means for combining and passing the signals of the transducers in a frequency range between upper and lower limits whose upper limit is below the resonant frequency indicated at Y—Y, in FIG. 3.

Although it may appear that the crossover region for the filters could be closer to the frequency indicated by the line Z—Z, in FIG. 3, it is to be noted that external influences will cause changes in the shape and location of the line A in an unpredictable manner. For this reason the optimum filter crossover region as indicated by line C—C, in FIG. 3, is just to the left of the frequency indicated by the line Y—Y, in the range where the characteristics of the system are not affected by load resonance.

FIG. 4 shows an embodiment of the invention as applied to an inner or rate stabilizing loop of a multiple loop feedback system. This system controls the position of an antenna 40 in a shipboard tracking radar so that it continues to point toward a moving target. The system includes a microwave comparator and receiver 41 in which signals representative of actual antenna position and target position are differenced to produce a target error signal. An outer feedback path 42 representing the actual antenna position is shown by a dashed line. However, it is to be recognized that this is for purposes of illustration only, since in practical radar tracking systems the phase and amplitude of the target echo signal contains within itself information as to the difference between target position and antenna position, which is analogous to the difference between desired and actual output conditions in the preceding embodiments.

The target error signal from the recevier and comparator 41 is supplied to an integrating circuit 43 where the very high frequency fluctuations caused by atmospheric aberrations and related disturbances are removed. The resultant signal is then supplied to a modulator 44 wherein an alternating current carrier signal is introduced. By so converting the signal it may be A.C. amplified to a very high degree without distortion. The target error signal is then supplied to an error detector circuit 45 similar to the error detecting circuits of the preceding embodiments. Here the signal is degeneratively regulated and dampened by a rate feedback signal. Feedback rate damping is a well known expedient which serves to hasten the settlement of any overshoots of output position resulting from suddenly applied input command signals. The degeneratively feed back rate signal also serves to stabilize the system against the oscillatory effects produced by the presence of non-linear friction in the system. The damped error signal is the raised to a usable amplitude by means of an A.C. amplifying circuit 46. Demodulator and integrating circuits 47 are provided at the output of the amplifier to remove the A.C. carrier signal and any undesirable high frequency components which may have been introduced along with the rate damping feedback. The demodulated signal is then used to actuate a power servo 48 which in turn operates through a gear train 49 and associated coupling means to turn the antenna 40.

Although the outer feedback loop transmits all frequency components including these within the unstable range, a signal producing means is provided to produce stable rate damping feedback signals. This is done in a manner similar to the dual channel feedback described in the preceding embodiments. Since, however, the present feedback arrangement is for the purpose of supplying rate damping signals rather than position feedback signals, the transducers on either side of the resonant load, are sensitive to rates of change rather than actual position. Also, because of the fact that the gearing and mechanical coupling to the antenna as well as the antenna itself contribute to resonance and accuracy problems, it is necessary that the system encompass as great a portion of these elements as possible. Thus, a rate gyro 50 is located on the antenna structure itself as close to the microwave sensing portion as possible, while a tachometer 51 is provided to sense the output velocity of the power servo or motor 48. A demodulator 52 is provided at the output of the A.C. excited rate gyro to produce a corresponding D.C. voltage similar to that produced by the tachometer. As in the embodiment of FIG. 2, the nature of the load and transducers are such that sufficient simulating effects are produced in the tachometer alone to adequately represent the signal transfer characteristics of the bypassed elements.

A frequency selective means, which is similar to that described in connection with FIG. 2, is provided to extract the accurate or stable frequency components from each of the two rate feedback transducers and to combine these extracted components to provide a rate damping feedback signal. A modulator 53 is provided at the output of the signal combining means for converting the feedback signal to a form useful in regulating the error signal from the modulator 44.

It is to be noted that a portion of the dual rate feedback system in the present embodiment, namely the rate gyro portion, serves an additional function; that of separately accounting for the vehicle motion dynamics. Without the rate gyro, the external feedback loop 42 in order to keep the antenna on target must compensate for both target movements and vehicle movements such as roll or pitch in the air or on a heavy sea. The rate gyro however, being an inertial device, is sensitive to rate of antenna movements caused both by command signals and by vehicle movements. Since vehicle movements generate signals predominately within the range of frequencies passed by the gyro feedback channel, they can, to a great extent, be compensated for without the necessity for generation of correction signals in the external loop. This results in greatly reduced design requirements on the remainder of the system.

While the invention has been described in its preferred embodiments it is to be understood that the words which have been used are words of description rather than in limitation and that changes within the purview of the appended claims may be made without departing from the true scope and spirit of the invention in its broader aspects.

What is claimed is:

1. In a servo system with a load having an input end and an output end, a motor connected to the input end of the load, means for providing an operating input to the motor, and feedback means for providing an input to the motor in opposing relation to the input of said input means including a first transducer producing a signal depending on the load output with frequency components in a range that includes a resonant frequency, a second transducer producing a signal depending on the load input with frequency components in a lower range overlapping the frequency range of the first transducer, and frequency selective means for combining and passing the signals of the transducers in a frequency range between upper and lower limits within the overlapping frequency range whose upper limit is below the resonant frequency that includes a frequency crossover region for passing signals of both transducers, a region between the lower limit and crossover region for passing the signal of the first transducer, and a region between the upper limit and the crossover region for passing the signal of the second transducer.

2. A system of the character claimed in claim 1 in which said frequency selective means includes a high pass filter connected to the second transducer, a low pass filter connected to the first transducer, and an adding device connected to the filters, the filters of the means having characteristics that supplement one another in the crossover frequency region.

3. A system of the character claimed in claim 2 in which the transducers are angular displacement measuring devices.

4. A system of the character claimed in claim 2 in which the transducers are angular rate measuring devices.

5. In a closed loop system having a servomotor, a load with an input part connected to the servomotor and an output part, means for providing an operating input to the servomotor, and means for providing a degenerative input to the servomotor including a first feedback channel with a device connected to the load output part providing a signal with components in a range that includes a resonant frequency, a second feedback channel with a device connected to the load input part providing a signal with components in a lower range overlapping the frequency range of the first device, means in the first and second channels for attenuating the signals of the devices in a frequency range above upper and below lower limits within the overlapping frequency range where the upper limit is below the resonant frequency that includes a frequency crossover region for passing the signals of both devices, a region between the lower limit and crossover region for passing the signal of the first channel device and a region between the upper limit and crossover region for passing the signal of the second channel device.

6. A system as claimed in claim 5 in which said attenuating and passing means are electrical filters with supplemental characteristics in the crossover frequency region.

7. A system as claimed in claim 6 in which the servomotor displaces the load about an axis, and the devices measure the displacement at the input and output parts of the load.

8. A system as claimed in claim 6, in which the servomotor displaces the load about an axis, and the devices measure the rate of displacement at the input and output parts of the load.

References Cited by the Examiner

UNITED STATES PATENTS

| | | | |
|---|---|---|---|
| 2,947,982 | 8/60 | Newell | 318—489 |
| 3,077,553 | 2/63 | Borghard et al. | 318—448 |

FOREIGN PATENTS

| | | |
|---|---|---|
| 872,422 | 7/61 | Great Britain. |

JOHN F. COUCH, *Primary Examiner.*

CHESTER L. JUSTUS, *Examiner.*